United States Patent [15] 3,671,492
Nakaguchi et al. [45] June 20, 1972

[54] 1:1 ALTERNATING COPOLYMERS OF CARBONYL OR THIOCARBONYL-CONTAINING NON-CONJUGATED COMPOUNDS AND CONJUGATED COMPOUNDS AND METHOD OF PREPARATION

[72] Inventors: Kohei Nakaguchi, Osaka; Shohachi Kawasumi, Kobe; Masaaki Hirooka, Ibaraki; Hiroshi Yabuuchi, Takatsuki; Hiroyoshi Takao, Ashiya, all of Japan

[73] Assignee: Sumitomo Chemical Company, Ltd., Higashi-ku, Osaka, Japan

[22] Filed: March 16, 1970

[21] Appl. No.: 20,087

Related U.S. Application Data

[63] Continuation of Ser. No. 567,392, June 25, 1966, abandoned.

[30] Foreign Application Priority Data

July 26, 1965 Japan.....................................40/45480
July 30, 1965 Japan.....................................40/46495
June 2, 1966 Japan.....................................41/35763

[52] U.S. Cl............260/85.5 ES, 117/161 LN, 171/161 UZ, 117/161 UR, 260/336 U, 260/33.8 U, 260/63 R, 260/63 N, 260/65, 260/72 R, 260/73 R, 260/77.5 R, 260/77.5 BB, 260/77.5 C, 260/77.5 UA, 260/79.1, 260/85.5 A, 260/88.5 B, 260/85.5 AN, 260/85.5 X, 260/86.1 R, 260/86.1 N, 260/86.1 E, 260/89.7 R

[51] Int. Cl........................C08f 3/40, C08f 3/42, C08f 3/74
[58] Field of Search................260/63, 67, 85.5 R, 85.5 DT, 260/85.5 X, 85.5 ES, 86.1, 88.3, 79.7, 85.5 AM, 88.3 L, 89.7 R, 77.5 R, 77.5 C, 77.5 U, 72, 73

[56] References Cited

UNITED STATES PATENTS 3,127,380 3/1964 Welch....................................260/85.5
3,159,607 12/1964 D'Alelio..............................260/82.1
3,326,870 6/1967 Nakaguchi et al.....................260/85.5

Primary Examiner—William H. Short
Assistant Examiner—L. L. Lee
Attorney—Stevens, Davis, Miller & Mosher

[57] ABSTRACT

A novel alternating copolymer is prepared by copolymerizing a compound having a polar group, such as a carbonyl or thiocarbonyl group, at a non-conjugated position and a conjugated vinyl compound in the presence of an organoaluminum halide. Alternating copolymers thus-produced are superior in thermal stability to conventional random copolymers and is resistant to coloration. Alternating copolymers obtained by copolymerizing vinyl acetate and methyl acrylate or acrylonitrile are preferred examples of these products.

10 Claims, No Drawings

1:1 ALTERNATING COPOLYMERS OF CARBONYL OR THIOCARBONYL-CONTAINING NON-CONJUGATED COMPOUNDS AND CONJUGATED COMPOUNDS AND METHOD OF PREPARATION

This application is a streamlined continuation of our copending application Ser. No. 567,392, filed July 25, 1966 and now abandoned.

This invention relates to a copolymer containing as one component an unsaturated compound having a carbonyl or thiocarbonyl group and to a process for the production thereof. More particularly, the invention provides an alternating copolymer of an unsaturated compound having a carbonyl or thiocarbonyl group in the non-conjugated position with the double bond (monomers of the group [A]) and a conjugated vinyl compound, or a substituted conjugated vinyl compound having nitrile or carbonyl group in the conjugated position (monomers of the group [B]). The invention further provides a process for the production of the copolymers using said monomers.

The present inventors have found alternating copolymers of conjugated vinyl compounds such as acrylonitrile or acrylic acid derivatives and olefinic or halogen-containing olefinic unsaturated compounds and provided a process for producing copolymers using said monomers. As the result of further studies, the inventors have found that this kind of complex copolymerization can be applied also to non-conjugated unsaturated compounds having carbonyl or thiocarbonyl groups as monomers of the group [A] and can be applied not only to conjugated vinyl compounds but also to the case where the compounds have substituents at the α- or β-positions as monomers of the group [B], and have discovered a group of novel alternating copolymers.

The present invention provides an alternating copolymer of a carbonyl or thiocarbonyl-containing non-conjugated unsaturated compound (monomer of the group [A]) having the formula:

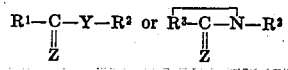

wherein $R^1$ is an $R^4$-, $R^4O$-, $R^4S$- or $R^5R^6N$-group; Z is an oxygen or sulfur atom; Y is an oxygen or sulfur atom or $—NR^7$ group; $R^2$ is a polymerizable unsaturated linkage-containing hydrocarbon radical having 2 to 20 carbon atoms or a substituted radical thereof; $R^3$ is an organo-cyclic residue having one to 20 carbon atoms; and $R^4$, $R^5$, $R^6$ and $R^7$ are individually a hydrocarbon radical having one to 20 carbon atoms, a substituted radical thereof or a hydrogen atom, and a conjugated compound having the general formula (monomer of the group [B]):

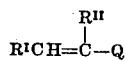

wherein $R'$ and $R''$ are respectively hydrocarbon radicals having one to 20 carbon atoms, halogen-containing hydrocarbon radicals having one to 20 carbon atoms, halogen atoms or hydrogen atom, at least one of $R'$ and $R''$ is hydrogen atom; and Q is a nitrile or

group, where $Y'$ is a group selected from ZH, ZR, ZMe, ZR'R'', R, a halogen atom and hydrogen atom; Z is an oxygen or sulfur atom; R is an organic radical having one to 20 carbon atoms; $R'$ and $R''$ are individually hydrogen atom or organic radicals having one to 20 carbon atoms, including the case where $R'$ and $R''$ are mutually bonded at other portion than nitrogen; and Me represents an element of Group I of the Mendeleev's Periodic Table or an ammonium group.

Further the present invention provides a process for producing said copolymer, which comprises contacting said non-conjugated unsaturated compound (monomer of the group [A]) and said conjugated compound (monomer of the group [B]) with (1) an organoaluminum halide having the formula:

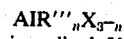

wherein $R'''$ is an organic radical; X is a halogen atom; and $n$ is an arbitrary number from 1 to 2, or a mixture of at least two compounds having the formulas:

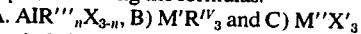

wherein $M'$ and $M''$ are aluminum or boron; $R'''$ and $R^{IV}$ are organic radicals; X and $X'$ are halogen atoms; and n is an arbitrary number from 1 to 2, or with (2) catalyst component (a) an organo-compound of a metal of Group IIb, IIIb or IVb of the Mendeleev's Periodic Table and catalyst component (b) a halogeno-compound of a metal of Group IIIb or IVb of the Periodic Table, wherein at least one metal component of (a) and (b) is aluminum or boron, and (a) must be contacted with (b) in the presence of at least the conjugated compound (monomers of the group [B]) of said monomers employed.

Still further the present invention provides a process for producing the copolymers in which the above-mentioned copolymerization reaction is effected in the presence of oxygen or an organic peroxide, if necessary.

The alternating copolymers of the present invention have not yet been known. The conjugated compounds (monomers of the group [B]) have been known, in general, as monomers having radical polymerizability, and radical polymerization using said monomers results in no other product than random copolymers. It is therefore quite unexpected that conjugated compounds of this kind give alternating copolymers with the unsaturated compounds (monomers of the group [A]).

In order to obtain the alternating copolymers in accordance with the process of the present invention, the characteristics of catalyst components are of importance. The process of the present invention requires aluminum or boron as a metal component and further requires the presence of an organic group and a halogen in combination therewith. Other important characteristic is that the metal component is coordinated with the conjugated compound. Particularly, the coordination with a halogen-containing metal component is of significance, and the copolymerization reaction proceeds through this kind of coordinated complex. The conjugated compound is required to be such that unsaturated linkages of the polar group thereof is in the position conjugated with carbon-carbon double bonds. This has a great significance in copolymerization reactivity.

In case of using the catalyst components of (a) an organo-compound of a metal from Groups IIb, IIIb and IVb of the Mendeleev's Periodic Table and (b) a halogeno-compound of a metal from Groups IIIb and IVb of the Table, it is not the case that the components (a) and (b) are previously mixed and then the mixture is employed as the polymerization catalyst. Such mixed catalyst is not suitable for the production of at least the alternating copolymer. In order to obtain the alternating copolymer according to the present invention the components (a) and (b) must be contacted each other in the presence of at least the conjugated compound (monomers of the group [B]). That is, for example, the copolymerization may be effected by contacting the component (b) with the conjugated compound (monomer of the group [B]) previously and then adding the component (a) thereto.

In the process of the present invention, the combination of monomers is of importance. No alternating copolymer can be obtained unless the monomer of the group [A] are combined with the monomer of the group [B]. The carbonyl or thiocarbonyl groups of the monomers of the group [A] are in non-conjugated positions to polymerizable double bonds. The carbonyl or nitrile groups of the monomers of the group [B] are in conjugated positions. The monomers of the group [A], have, in general, small e-values in the Q-e scheme proposed by Price-Alfrey, and have, in most cases, less than 0.5, preferably minus e values.

In the process of the present invention, the presence of polar solvents or polar substances is not desirable, in general.

Particularly, the presence of components forming complexes with the metal components employed in the present invention is not preferable. For example, ethers such as ethylether, tetrahydrofuran and dioxane; ketones such as acetone; esters; nitriles; and amides such as dimethylformamide are not usable, and alcohols and water are neither preferable.

In the process of the present invention, when the polymerization is effected in the presence of oxygen or an organic peroxide, the reaction is promoted, in general, or the polymerization can be effected by use of a relatively small amount of catalyst. It is, however, needless to say that no alternating copolymers can be obtained by mere addition of oxygen or an organic peroxide to said non-conjugated unsaturated compounds and said conjugated compounds. Further, no alternating copolymers can either be obtained by mere use of a catalyst system prepared by combining trialkylboron or trialkylaluminum with oxygen or an organic peroxide.

The promoting mechanism of oxygen and organic peroxide in the process of the present invention is not sufficiently clear, but it is not considered that they show the same roles as those of conventional initiators in radical polymerization systems in which zinc chloride has been coordinated with methyl methacrylate or acrylonitrile. This is clear also from the fact that the polymerization in accordance with the present invention cannot be promoted by use of all kinds of radical initiators. In the process of the present invention, the excellent promoting effect can be seen only by adding oxygen or an organic peroxide, and no effect can be attained at all in the case of using other radical initiator containing no oxygen, such as azobisisobutyronitrile.

The detailed remarks of the formulas:

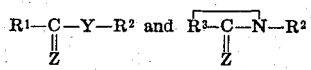

representing the compounds employed in the present invention have already been mentioned. That is, $R^1$ is such a group as $R^4$—, $R^4O$—, $R^4S$— and $R^5R^6N$—, and as the hydrocarbon radicals in $R^4$, $R^5$ and $R^6$, there may be used alkyl, aryl, aralkyl, alkylaryl and cycloalkyl groups, including bridged ring hydrocarbon groups. Substituted radicals thereof mean the case where said hydrocarbon groups contain other substituents which do not inhibit the copolymerization reaction, and hydrocarbon groups containing halogens, in particular, are frequently employed. Y is an oxygen or sulfur atom or —$NR^7$ group, where $R^7$ is same as said $R^4$, $R^5$ or $R^6$. As the polymerizable unsaturated linkages in $R^2$, i.e. polymerizable unsaturated linkage-containing hydrocarbon radicals having two to 20 carbon atoms, vinyl and vinylidene groups are preferred and a vinylene group is also used in some cases. Particularly, hydrocarbon radicals containing vinyl group are most frequently employed and, in many cases $R^2$ is a vinyl group itself. An allyl and isopropenyl group can also be used. As the case where the hydrocarbon group contains other substituents, there may be raised instances where halogens are contained. The substituents may be those containing heteroatoms which do not disturb the polymerization reaction, but it is necessary that they do not conjugate with unsaturated linkages. $R^3$ is an organo-cyclic radical having one to 20 carbon atoms which can contain not only a hydrocarbon ring but other heteroatom, preferably oxygen, sulfur or nitrogen. For example, a part of the ring may be formed with the radical of $>C=O$, $>C=S$, $-O-$, $-S-$ or $>N-R$. Alternatively, the radical can have a polycyclic structure. In short, the abovementioned non-conjugated unsaturated compounds are in common in the linking mode of the type

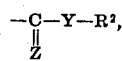

In case this condition is satisfied, the reactivities of monomers are similar and are not substantially affected by the form of other portion. In these components, the kinds of concrete compounds are as follows: As the O-unsaturated or S-unsaturated compounds, there are unsaturated esters of carboxylic, thiocarboxylic, thioncarboxylic or dithiocarboxylic acids, carbonates, thiolcarbonates, thioncarbonates, dithiocarbonates, trithiocarbonates, carbamates, thiolcarbamates, thioncarbamates and dithiocarbamates, and as N-unsaturated compounds, there may be illustrated carboxylic acid amides, thiolcarboxylic acid amides, carbamates, thiolcarbamates, thioncarbamates, dithiocarbamates, urea compounds, thiourea compounds and a group of N-unsaturated cyclic amide compounds. The N-unsaturated cyclic amide compounds are compounds having the general formula

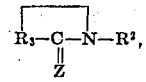

and include such compounds as lactam, dicarboxylic acid imides, dithiocarboxylic acid imides, oxazolidone and alkylene-urea. The compounds may be those substituted by halogens or other substituents.

Examples of the above compounds are vinyl formate, vinyl acetate, vinyl propionate, vinyl isocaproate, vinyl pelargonate, vinyl 2-ethyl-hexanecarboxylate, vinyl stearate, vinyl levulinate, ethylvinyl oxalate, vinyl chloroacetate, vinyl dichloroacetate, vinyl thiolacetate, vinyl benzoate, vinyl cyclohexane-carboxylate, vinyl norbornane-2-carboxylate, allyl acetate, allyl butyrate, allyl laurate, allyl cyclobutane carboxylate, allyl chloroacetate, 2-chloroallyl acetate, isopropenyl acetate, isopropenyl norbornane-2-carboxylate, α-methallyl acetate, γ-methallyl acetate, methylmethallyl oxalate, 1-propenyl acetate, 1-butenyl acetate, 1-isobutenyl acetate, methylvinyl carbonate, S-ethyl-O-vinyl-thiolcarbonate, O-cyclohexyl-O-vinyl-thioncarbonate, phenylvinyl trithiocarbonate, O-vinyl-N-cyclohexyl carbamate, O-vinyl-N,N-dimethyl carbamate, S-vinyl-N,N-diethyl thiolcarbamate, O-allyl-N,N-dimethyl thiocarbamate, S-isopropenyl-N,N-diethyl dithiocarbamate, N-vinyl-acetamide, N-allyl-N-methyl-propionic acid amide, N-vinyl benzoic acid amide, N-vinyl thioacetamide, N-vinyl-urethane (N-vinyl-O-ethyl-carbamate), N-ethyl-N-vinyl-methyl-carbamate, N-vinyl-S-phenylthiolcarbamate, N-vinyl-O-ethyl-thiocarbamate, N-vinyl-N-ethyl-S-ethyl dithiocarbamate, N-vinyl-N-methyl-S-ethyl thiolcarbamate, N-ethyl-N'-vinyl-urea, N,N-diethyl-N'-vinyl-N'-ethyl-urea, N-phenyl-N'-vinyl-thiourea, N-vinyl-pyrrolidone, N-vinyl-piperidone, N-vinyl caprolactam, N-vinyl-succinic acid imide, N-vinyl phthalimide, N-allylsuccinic acid imide, N-isopropenyl phthalimide, N-vinyloxazolidinone, N-allyl-5-methyl-oxazolidinone, N-vinyldiglycolyl imide, N-vinyl-ethylene urea, N-allyl-ethylene urea, N-ethyl-N-vinyl-propylene urea, and N-vinyl-ethylene thiourea.

The conjugated compounds having the general formula:

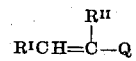

are those having as Q a nitrile or

group, wherein Y' is defined already. As the organic radicals having one to 20 carbon atoms represented by R, R' and R'' in said Y', hydrocarbon radicals are preferred and derivative groups thereof are also usable. Examples thereof are such groups as alkyl, aryl, aralkyl, alkylaryl and cycloalkyl. Further, as the halogens, chlorine, bromine, iodine and fluorine are used. Me represents an element of Group I of the Mendeleev's Periodic Table or an ammonium group. Such element includes, for example, lithium, sodium, potassium, rubidium, cesium, copper and silver. That NR'R'', include the case where R' and R'' are mutually bonded at other portions than nitrogen signifies that, for examples, morpholino, pyrrolidino and piperadino groups, are included.

In case both R' and R'' are hydrogen, the conjugated compounds are acrylonitrile or compounds of acrylic acid series. These compounds include acrylates, thiolacrylates, acrylamides, thioacrylamides, N-substituted acrylamides, N,N'-disubstituted acrylamides, acryloyl halides, acrylic acid, thiolacrylic acid, salts of said acids, acrolein and vinylketones.

In the case of the substituted vinyl compounds, either R' or R'' is hydrogen, the other one is a hydrocarbon radical, a halogen-containing hydrocarbon radical or a halogen, and may be a derivative group of the hydrocarbon having other substituent inert to the polymerization reaction. As the hydrocarbon radicals, alkyl, aryl, aralkyl, alkylaryl and cycloalkyl groups, for example, are frequently used. The halogens or halogens employed for substitution are chlorine, bromine, iodine and fluorine. Consequently, the above compounds are α- or β-substituted acrylonitrile or compounds of acrylic or thioacrylic acid series. Examples of these conjugated compounds are methyl acrylate, ethyl acrylate, n-butyl acrylate, n-amyl acrylate, octadecyl acrylate, allyl acrylate, O-toluyl acrylate, benzyl acrylate, cyclohexyl acrylate, 2-chloroethyl acrylate, β-chloroallyl acrylate, methyl thiolacrylate, ethyl thiolacrylate, acrylamide, N-methyl acrylamide, N-n-butyl acrylamide, N-2-ethylhexyl acrylamide, N-stearyl acrylamide, N-cyclohexyl acrylamide, N-tolyl acrylamide, N,N-dimethyl acrylamide, N-methyl-N-ethyl acrylamide, acrylyl morpholine, acrylyl pyrrolidine, acryloyl chloride, acryloyl bromide, acrylic acid, thiolacrylic acid, sodium acrylate, potassium acrylate, ammonium acrylate, acrolein, methylvinylketone, ethylvinylketone and phenylvinylketone. Further, examples of α- or β-substituted conjugated vinyl compounds are methyl methacrylate, ethyl methacrylate, butyl methacrylate, octadecyl methacrylate, benzyl methacrylate, phenyl methacrylate, tolyl methacrylate, cyclohexyl methacrylate, 2-chloroethyl methacrylate, methyl thiolmethacrylate, ethyl thiolmethacrylate, methyl α-ethylacrylate, ethyl α-butylacrylate, methyl α-cyclohexylacrylate, methyl α-phenylacrylate, methyl α-chloroacrylate, methyl α-bromoacrylate, methyl α-chloromethylacrylate, methyl α-(p-chlorophenyl)acrylate, methacrylamide, N-ethylmethacrylamide, N-cyclohexyl-methacrylamide, N,N-dimethyl-methacrylamide, methacrylyl piperidine, α-ethylacrylamide, α-chloroacrylamide, α-chloromethyl-acrylamide, methacryloyl chloride, α-chloroacryloyl chloride, α-ethyl-methacryloyl chloride, methacrylic acid, thiolmethacrylic acid, sodium methacrylate, ammonium α-fluoro-acrylate, methacrolein, methylisopropenylketone, 1-chlorobutenylethylketone, methacrylonitrile, α-ethyl-acrylonitrile, α-cyclohexyl-acrylonitrile, α-chloroacrylonitrile, α-chloromethyl-acrylonitrile, ethyl crotonate, phenyl crotonate, crotonamide, crotonic acid chloride, crotonitrile, methyl cinnamate, butyl cinnamate, chloromethyl cinnamate, cinnamic nitrile, methyl β-ethylacrylate and methyl β-chloromethylacrylate. However, the compounds are not limited to the above compounds.

The catalyst components to be employed in the process of the present invention are (1) compounds having the formula:

$$AlR'''_nX_{3-n}, M'R'''_3 \text{ or } M''X'_3$$

wherein M' and M'' are aluminum or boron; R''' and R'''' are organic radicals; X and X 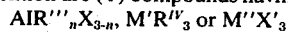 are halogens; and n is an arbitrary number of 1 to 2, or (2) (a) organic compounds of metals of Group IIb, IIIb or IVb of the Mendeleev's Periodic Table and (b) halides of metals of Group IIIb or IVb of the Mendeleev's Periodic Table.

In the compounds of aluminum or boron having the formula $AlR'''_{n3-n}, M'R'''_3$ or $M''X'_3$, R''' and R'''' are preferably hydrocarbon radicals having one to 20 carbon atoms, or derivative groups having inert substituents may be used. For example, there may be illustrated compounds having alkyl, alkenyl, aryl, aralkyl, alkylaryl or cycloalkyl groups. Examples thereof are methyl, ethyl, propyl, butyl, hexyl, octyl, decyl, dodecyl, stearyl, phenyl, tolyl, naphthyl, benzyl, cyclopentadienyl and cyclohexyl. As the X, there is used chlorine, bromine, iodine or fluorine.

Concretely, the compounds having the formula $AlR'''_nX_{3-n}$ include, for example, methylaluminum dichloride, ethylaluminum dichloride, isobutylaluminum dichloride, hexylaluminum dichloride, dodecylaluminum dichloride, phenylaluminum dichloride, cyclohexylaluminum dichloride, methylaluminum dibromide, ethylaluminum diiodide, vinylaluminum dichloride, ethylaluminum sesquichloride, ethylaluminum sesquibromide, ethylaluminum sesquifluoride, methylaluminum sesquichloride, diethylaluminum chloride, diethylaluminum fluoride, dicyclohexylaluminum chloride. The compounds having the formula $M'R'''_3$ include trimethylaluminum, triethylaluminum, tripropylaluminum, tributylaluminum, trihexylaluminum, tridecylaluminum, triphenylaluminum, tricyclohexylaluminum, tribenzylaluminum, trimethylboron, triethylboron, tributylboron, trihexylboron, diethylphenylboron, diethyl-p-tolylboron and tricyclohexylboron. The compounds having the formula $M''X'_3$ include aluminum trichloride, aluminum tribromide, aluminum triiodide, partially fluorinated aluminum chloride, boron trichloride, boron trifluoride, boron tribromide and boron triiodide.

The organic compounds of metals of Group IIb, IIIb or IVb of the Mendeleev's Periodic Table which are used as the catalysts of item (2) are those having, as metal components thereof, zinc, cadmium, mercury, boron, aluminum, gallium, indium, thallium, germanium, tin and lead. Particularly, the metal components of zinc, boron, aluminum and tin are frequently employed. As the organic groups, hydrocarbon groups or derivative groups thereof are preferable, and those having alkyl, alkenyl, aryl, aralkyl, alkylaryl or cycloalkyl groups are particularly effective. These organo-metallic compounds include also the case where other groups than organic groups are attached to the metal. Particularly useful are organo-metallic compounds having the formula $$M'''R'_nX''_{p-n}$$ 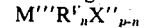

wherein M''' is a metal of Group IIb, IIIb or IVb of the Mendeleev's Periodic Table; R' is a hydrocarbon group having one to 20 carbon atoms or a substituted group thereof; p is the valency of the metal; and n is an arbitrary number of 1 to p. The organo-metallic compounds are particularly effective when n = p. Of course, other organic compounds of metals of Group IIb, IIIb or IVb of the Mendeleev's Periodic Table may also be used, if necessary. These compounds include, for example, diethylzinc, ethylzinc chloride, diethylcadmium, diethylmercury, diphenylmercury, triethylboron, tributylboron, tricyclohexylboron, ethylboron bromide, triethylaluminum, tributylaluminum, trihexylaluminum, tricyclohexylaluminum, vinyldiethylaluminum, diethylaluminum chloride, ethylaluminum sesquichloride, ethylaluminum dichloride, trimethylgallium, triethylgallium, triethylindium, tetraethylgermanium, tetramethyltin, tetraethyltin, tetraisobutyltin, dimethyldiethyltin, tetraphenyltin, tetrabenzyltin, diethyldiphenyltin, triethyltin chloride, diethyltin dichloride, ethyltin trichloride, tetramethyllead, tetraethyllead, dimethyldiethyllead and triethyllead chloride.

On the other hand, the metal halides to be used are halides of metals of Group IIIb or IVb of the Mendeleev's Periodic Table and include, for example, compounds of boron, aluminum, gallium, indium, thallium, germanium, tin and lead. As the halogen, there is used any of chlorine, bromine, iodine and fluorine. As these metal halides, those having other groups than halogens may also be used. Particularly useful metal halides in the process of the present invention are compounds having the formula:

$$M^{IV}X'''_mR^{VI}_{q-m}$$ 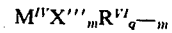

wherein $M^{IV}$ is a metal of Group IIIb or IVb of the Mendeleev's Periodic Table; X''' is a halogen atom; $R^{IV}$ is a hydrocarbon group having one to 20 carbon atoms or a substituent thereof; q is the valency of the metal; and m is an arbitrary number of 1 to q. When m = q, favorable results are readily obtained. Of course, other halides of metals of Group IIIb or IVb of the Mendeleev's Periodic Table may also be used, if necessary. Examples of metal halides useful for the process of the present invention are boron trichloride, boron trifluoride, boron tribromide, boron triiodide, ethylboron dichloride, diethylboron chloride, aluminum trichloride, aluminum tribromide, aluminum triiodide, partially fluorinated aluminum chloride, ethylaluminum dichloride, methylaluminum dibromide, ethylaluminum sesquichloride, diethylaluminum chloride, gallium trichloride, gallium dichloride, germanium tetrachloride, tin tetrachloride, tin tetrabromide, tin tetraiodide, ethyltin trichloride, methyltin trichloride, phenyltin trichloride, dimethyltin dibromide, diethyltin dichloride, diisobutyltin dichloride, triethyltin chloride, lead tetrachloride, and diethyllead dichloride.

In the catalysts of item (2), in case there is used the combination of an organic compound of a metal of Group IIb, IIIb or IVb of the Mendeleev's Periodic Table and a halide of a metal of Group IIIb or IVb, the organo-metallic compound and the metal halide are employed without previous mixing. The mixing of said components is desirably effected in the presence of at least said conjugated vinyl compound. Particularly favorable results are obtained when the organo-metallic compound is added after the conjugated compound and the metal halide have been mixed.

The organic peroxides to be used in the process of the present invention are the general organic compounds having peroxide linkages, and include, for example, diacyl peroxides, ketone peroxides, aldehyde peroxides, ether peroxides, hydroperoxides, dihydrocarbyl peroxides, peracid esters, dihydrocarbyl percarbonates and percarbamates. Examples of these compounds are benzoyl peroxide, lauroyl peroxide, 2,4-dichlorobenzoyl peroxide, 4-chloro-benzoyl peroxide, acetyl peroxide, stearyl peroxide, phthaloyl peroxide, methylethylketone peroxide, cyclohexanone peroxide, t-butyl hydroperoxide, p-menthane hydroperoxide, diisopropylbenzene hydroperoxide, cumene hydroperoxide, di-t-butyl peroxide, dicumyl peroxide, t-butyl cumyl peroxide, t-butyl perbenzoate, t-butyl perisobutyrate, t-butyl peracetate, t-butyl peroxypivalate, phenyl percarbamate, diisopropyl percarbonate and t-butyl perisopropyl carbonate, but the compounds are not limited thereto. There is observed such a tendency that the higher the peroxides in radical decomposition velocity, the higher the promoting actions of the peroxides.

In practicing the present invention, the catalyst components may be used at any proportions, but a proportion of 0.05—10 mols, preferably 0.02—1.5 mols, per mol of the conjugated compound [B] is frequently employed. Generally speaking, favorable results can easily be obtained when the conjugated compound is used in combination with a substantially equimolar amount of the halogen-containing metal compound. Of course, the metal compound may be used in excess or in less amount. However, in case the halogen-containing metal component is used in excessively smaller amount than the conjugated compound, the polymerization activity is greatly lowered in some cases and therefore it is not desirable to make the concentration thereof excessively low. Generally, at relatively low concentrations, it is effective to carry out the polymerization particularly in the presence of an organic peroxide or oxygen. The effects of organic peroxide or oxygen are markedly displayed even at such a low temperature as −78° C., for example. Even when these components are used in relatively small amounts, sufficiently high effects can be expected. For example, promoting action is observed by addition of said components in amounts of about 0.01–5 percent of the conjugated compound. Of course, the components can be effectively employed even at higher or lower concentrations than the above. Generally speaking, desirable results can be attained by contacting and complexing the halogen-containing metal compound with the conjugated compound in the absence of oxygen or organic peroxide. Depending on the conditions, however, the catalyst components may be added later to the monomer mixture.

As the polymerization temperature, any temperature may be selected from the range of from such a low temperature as −150° C. to such a temperature as +100° C. The copolymerization reaction in accordance with the process of the present invention quickly progresses even at markedly low temperatures. This shows the fact that there is required a greatly low activation energy.

In the practice of the process of the present invention, bulk-polymerization can be effected in liquid monomers and inert solvent may also be used. As such solvents, there are employed hydrocarbons or halogen-containing hydrocarbon compounds, for example. Examples of such solvents are propane, butane, pentane, hexane, heptane, octane, ligroin, petroleum ether, other petroleum series mixed solvents, benzene, toluene, xylene, methylene dichloride, ethylene dichloride, trichloroethylene, tetrachloroethylene, butyl chloride, chlorobenzene and bromobenzene. As has already been mentioned, compounds forming stable complexes with the catalyst components are not desirable as solvents.

After completion of the polymerization reaction, after-treatments are conducted according to ordinary procedures to purify and recover polymerization resultants. As such procedures, there are optionally adopted, for example, alcohol treatment, alcohol-hydrochloric acid treatment, hydrochloric acid-water treatment, or any after-treatment procedures employed in conventional cation polymerization using Lewis acids, or in polymerization using Ziegler-Natta catalysts. However, it is also possible to adopt procedures of separating and recovering catalyst components from polymerization resultants, without decomposing the catalyst components, by addition of compounds forming complexes with said components.

The following examples illustrate the present invention further in detail, but the invention is not intended to be limited thereto at all:

EXAMPLE 1

A 200 ml. three-necked flask equipped with a stirrer was evacuated and flushed with nitrogen, then was cooled to −78° C. Into the flask, 20 ml. of n-heptane and 4 g of methyl acrylate were mixed in a nitrogen atmosphere. To the mixture, 12.5 mmol. of ethylaluminum sesquichloride ($Al_2Et_3Cl_3$) was further added. Into the mixture, 30 g of vinyl acetate was added with stirring and polymerization was effected for 1 hour. The polymerization was terminated by addition of methanol. Thereafter, the content was transferred into a large amount of methanol, and insolubles were recovered, thoroughly washed with methanol and then dried at 50° C. under reduced pressure to obtain 4.71 g of a white solid copolymer. This copolymer was soluble in acetone and was insoluble in water. The copolymer was reprecipitated and purified with acetone-methanol and was dissolved in benzene to effect viscosity measurement at 30° C., whereby an intrinsic viscosity value was 3.02 dl/g. The results of elementary analysis of the copolymer were C: 55.12 percent and H: 7.68 percent which well coincided with the calculated values C: 55.81 percent and H: 7.03 percent as an alternating copolymer. The copolymer softened at 95°–98° C. When pressed, the copolymer gave a transparent film excellent in properties. The specific gravity of the film measured at 23° C. using density gradient tube was 1.2075.

Further, similar alternating copolymers were obtained as well as in the case where there were used ethylboron dichloride, diethylboron chloride, diethylaluminum chloride, methylaluminum sesquibromide and a 1:1 mixture of aluminum chloride and trihexylaluminum, respectively, in place of the ethylaluminum sesquichloride.

EXAMPLE 2

To a 100 ml. three-necked flask, 20 ml. of toluene, 2 g of methyl acrylate and 16 mmol. of ethylaluminum dichloride ($AlEtCl_2$) were added in this order, and the compounds were admixed. Into the mixture, 15 g of vinyl acetate was added with stirring at −78° C. The mixture was elevated in temperature to 25° C. and polymerization was effected for one hour. The same treatments as in Example 1 were conducted to obtain 3.72 g of a white solid copolymer having an intrinsic viscosity of 1.06 dl/g. Similar copolymers were obtained as well in the case where there were used, under the same conditions as above, vinyl chloroacetate, vinyl thiolacetate, ethylvinyl oxalate methyl vinyl carbonate and vinyl norbornane-2-carboxylate, respectively, in place of the vinyl acetate.

EXAMPLE 3

In a 300 ml. four-necked flask, 3.4 g of methyl acrylate, 40 mmol. of tin tetrachloride (as 1.3 g/ml. toluene solution) and 50 ml. of toluene were mixed in a nitrogen atmosphere. The mixture was cooled to −78° C., and 17 g of vinyl acetate and 10 mmol. of triethyl-aluminum (as 0.2 g/ml. toluene solution) were added to the mixture. The resulting mixture was elevated in temperature to 0° C. with stirring, and polymerization was effected for 1 hour, while injecting a nitrogen gas containing 5 percent of oxygen, to obtain 4.40 g of a white solid copolymer having an intrinsic viscosity of 0.59 dl/g. Similar copolymers were obtained as well in the case where there were used, under the same conditions as above, a combination of aluminum tribromide-triethyl boron, boron trichloride-tetraethyltin, and boron tetrachloride-diethylzinc, respectively, in place of the combination of tin tetrachloride-triethylaluminum.

EXAMPLE 4

A 200 ml. three-necked flask was cooled to −78° C. in a nitrogen atmosphere. Into the flask, 20 ml. of n-heptane, 2 g of acrylonitrile and 25 mmol. of ethylaluminum sesquichloride were added, and the compounds were admixed. To the mixture, 30 g of vinyl acetate was added, and polymerization was effected for 1.5 hours to obtain 0.36 g of a white solid copolymer. According to viscosity measurement at 30° C. in dimethylformamide solution, it was found that the intrinsic viscosity of the copolymer was 0.30 dl/g. The infrared absorption spectrum of the copolymer had characteristic absorptions derived, respectively, from vinyl acetate and acrylonitrile. The elementary analysis values of the copolymer were C: 60.56 percent, H: 7.46 percent and N: 11.03 percent, and well coincided with the calculated value C: 60.42 percent, H: 6.51 percent and N: 10.07 percent of an alternating copolymer. Further, even when the polymerization was effected by variously changing the monomer composition, there was always obtained a copolymer containing the two monomers at a molar proportion of 1:1. From this, it was judged that the copolymer obtained was an alternating polymer. The copolymer softened at 93°–97° C. and gave a film when pressed. The specific gravity of the film measured at 23° C. was 1.181.

EXAMPLE 5

In Example 3, 2.1 g of acrylonitrile was used in place of the methyl acrylate, and the polymerization was effected at 0° C. for 6 hours in a nitrogen atmosphere to obtain 1.24 g of a copolymer.

EXAMPLE 6

In Example 3, 2.1 g of acrylonitrile was used in place of the methyl acrylate, and the polymerization was effected for 2 hours in a nitrogen current in the presence of 5 mmol. of benzoyl peroxide to obtain 0.97 g of a copolymer. The elementary analysis values of the copolymer were C: 60.06 percent, H: 6.99 percent and N: 10.80 percent, and well coincided with the calculated values of an alternating copolymer.

EXAMPLE 7

Into a 300 ml. four-necked flask, 50 ml. of toluene and 4.1 g of methyl thiolacrylate were charged in a nitrogen atmosphere. Into the flask, boron trifluoride was injected at −78° C. to form a complex. To the complex, 17 g of vinyl acetate and 40 mmol. of triethylaluminum were added, and polymerization was effected for one hour while injecting a nitrogen gas containing 5 percent of oxygen and for additional 2 hours, after elevating the temperature to 0° C., to obtain 1.49 g of a copolymer.

EXAMPLE 8

A 200 ml. three-necked flask was cooled to −78° C. in a nitrogen atmosphere. Into the flask, 30 ml. of toluene, 3 g of methyl acrylate, 12.5 mmol. of ethyl-aluminum sesquichloride and 10 g of vinyl stearate were successively added. Thereafter, the temperature was elevated to 25° C. and polymerization was effected for 5 hours to obtain 5.98 g of a white solid copolymer. The elementary analysis values of the copolymer were C: 71.72 percent and H: 11.50 percent, and well coincided with the calculated values C: 72.68 percent and H: 11.18 percent of an alternating copolymer.

EXAMPLE 9

A 100 ml. three-necked flask was cooled to −78° C. in a nitrogen atmosphere. Into the flask, 20 ml. of toluene, 2 g of methyl acrylate, 12.5 mmol. of ethylaluminum sesquichloride and 15 g of vinyl benzoate were added. The resulting mixture was elevated in temperature to 25° C. and was polymerized for 44 hours to obtain 4.67 g of a white solid copolymer. The elementary analysis values of the copolymer were C: 65.91 percent and H: 5.86 percent, and well coincided with the calculated values C:66.61 percent and H: 6.02 percent as an alternating copolymer.

EXAMPLE 10

A 100 ml. three-necked flask was cooled to −78° C. in a nitrogen atmosphere. Into the flask, 20 ml. of toluene, 4 g of methyl acrylate, 12.5 mmol. of ethylaluminum sesquichloride and 10 g of vinyl formate were added, and the compounds were reacted with stirring for 10 minutes to obtain 0.36 g of a white solid copolymer. The elementary analysis values of the copolymer were C: 53.80 percent and H: 6.20 percent, and well coincided with the calculated values C: 53.16 percent and H: 6.37 percent as an alternating copolymer.

EXAMPLE 11

A 100 ml. three-necked flask was cooled to −78° C. in a nitrogen atmosphere. Into the flask, 20 ml. of n-heptane, 3 g of methyl acrylate, 12.5 mmol. of ethylaluminum sesquichloride and 10 g of allyl acetate were mixed. The temperature was then elevated to 0° C. and polymerization was effected for one hour to obtain 1.32 g of a colorless elastomeric solid copolymer. The elementary analysis values of the copolymer were C: 57.17 percent and H: 7.20 percent, and well coincided with the calculated values C: 58.05 percent and H: 7.58 percent as an alternating copolymer. Under the same conditions as above, isopropenyl acetate and 1-butenyl acetate were used, respectively, in place of the allyl acetate, whereby copolymers were obtained as well.

EXAMPLE 12

A 100 ml. three-necked flask was cooled to −78° C. in a nitrogen atmosphere. Into the flask, 10 ml. of toluene, 3 g of methyl acrylate, 12.5 mmol. of ethylaluminum sesquichloride and 15 g of allyl laurate were added. Thereafter, the temperature was elevated to 25° C. with stirring, and polymerization was effected for 143 hours to obtain 2.03 g of a tacky transparent alternating copolymer.

EXAMPLE 13

A 200 ml. three-necked flask fitted with a stirrer was evacuated and flushed with nitrogen and was cooled to −78° C. Into the flask, 3 g of methyl methacrylate and 12.5 mmol. of ethylaluminum sesquichloride (as 0.2 g/ml. toluene solution). The mixture was elevated in temperature to 25° C. with stirring and was incorporated with 15 g of vinyl acetate, and polymerization was effected at 25° C. for 46 hours to obtain 0.93 g of a white solid copolymer. The elementary analysis values of the copolymer were C: 59.18 percent and H: 7.99 percent, and well coincided with the calculated values C: 58.05 percent and H: 7.58 percent as an alternating copolymer.

Further, the similar copolymer to the above was obtained even in the case where allyl acetate or vinyl benzoate was used under the same conditions in place of the vinyl acetate.

EXAMPLE 14

A 200 ml. three-necked flask fitted with a stirrer was evacuated and flushed with nitrogen and was cooled to −15° C. Into the flask, 5 g of n-butyl crotonate and 12.5 mmol. of ethylaluminum sesquichloride (as 0.2 g/ml. toluene solution) were added in a nitrogen atmosphere, and the compounds were thoroughly stirred. To the mixture, 15 g of vinyl acetate was added, and polymerization was effected at −15° C. for 75 hours to obtain 4.55 g of a white solid copolymer. The results of elementary analysis of the copolymer were C: 62.86 percent and H: 9.22 percent, and well coincided with the calculated values C: 63.13 percent and H: 8.83 percent as an alternating copolymer.

EXAMPLE 15

A 200 ml. three-necked flask fitted with a stirrer was evacuated and flushed with nitrogen. Into the flask, 20 ml. of n-heptane and 4 g of acrylonitrile were added in a nitrogen atmosphere and the flask was cooled to −10° C. Subsequently, 50 mmol. of ethylaluminum sesquichloride ($AlEt_{1.5}Cl_{1.5}$) (as 0.4 g/ml. heptane solution) was added, and the compounds were thoroughly stirred. To the mixture, 10 g of N-vinyl pyrrolidone was added, and reaction was effected for 1 hour. The reaction product was charged in a large amount of methanol, and a deposited solid was thoroughly washed with methanol and was dried in vacuo at 40° C., to obtain 0.54 of a white solid copolymer. The nitrogen content of the copolymer according to elementary analysis was 16.69 percent and well coincided with the calculated value 17.06 percent as an alternating copolymer.

EXAMPLE 16

A 200 ml. three-necked flask fitted with a stirrer was evacuated and was cooled to −78° C. Into the flask, 20 ml. of n-heptane, 8.6 g of methyl acrylate and 11 g of N-vinyl pyrrolidone were added in this order, and the compounds were homogeneously admixed. To the mixture, 25 mmol. of ethylaluminum sesquichloride ($AlEt_{1.5}Cl_{1.5}$) (as 0.4 g/ml. heptane solution) was added, and reaction was effected for 2 hours. Thereafter, the same treatments as in Example 1 were conducted to obtain 9.42 g of a copolymer. Further, according to the same prescription as above, N-vinyl oxazolidone was used in place of the N-vinyl pyrrolidone and methyl thiolacrylate in place of the methyl acrylate to obtain a similar copolymer.

EXAMPLE 17

Into a 200 ml. three-necked flask, 20 ml. of n-heptane, 10 g of methyl methacrylate, 11 g of N-vinyl pyrrolidone and 25 mmol. of ethylaluminum sesquichloride were added in this order at 0° C. in a nitrogen atmosphere, and polymerization was effected with stirring for 48 hours. Thereafter, the same treatments as in Example 1 were carried out to obtain 0.40 g of a copolymer.

EXAMPLE 18

Into a 200 ml. three-necked flask, 20 ml. of toluene, 2 g of acrylonitrile and 25 mmol. of ethylaluminum dibromide ($AlEtBr_2$) were added in this order at 25° C. in a nitrogen atmosphere, and the mixtures were homogeneously admixed. To the mixture, 10 g of N-ethyl-N'-vinyl-urea was added, and reaction was affected for 2 hours. Thereafter, the same treatments as in Example 1 were carried out to obtain 2.18 g of a copolymer. A similar copolymer was obtained as well in the case where N-allyl-ethylene urea was used in place of the N-ethyl-N'-vinyl-urea. Further, similar copolymers were obtained also in the case where a mixed catalyst of trihexylaluminum and aluminum trichloride, a system prepared by adding benzoyl peroxide to triethylaluminum and tin tetrachloride, and a system formed by injecting a nitrogen gas containing 5 percent of oxygen into diethylzinc-boron trichloride were used, respectively, in place of the ethylaluminum dibromide.

EXAMPLE 19

Into a 200 ml. three-necked flask, 20 ml. of ethylene dichloride, 3 g of acrylonitrile and 50 mmol. of ethylaluminum sesquichloride were added in a nitrogen atmosphere, and the compounds were homogeneously admixed. To the mixture, 10 g of N-vinyl-ethyl carbamate was added while maintaining the temperature at 25° C., and polymerization was effected with stirring for 2 hours to obtain 1.01 g of a solid copolymer. Similar copolymers were obtained also in the case where N-vinyl-N-ethyl-S-ethyl dithiocarbamate and N-vinyl-N-methyl-S-ethyl-thiolcarbamate were used, respectively, in place of the N-vinyl-ethylcarbamate.

EXAMPLE 20

Into a 200 ml. three-necked flask, 20 ml. of toluene, 2 g of methyl acrylate and 25 mmol. of ethylaluminum dichloride were added in a nitrogen atmosphere, and the compounds were homogeneously admixed. To the mixtures, 15 g of N-vinyl acetamide was added, while maintaining the temperature at −10° C., and polymerization was effected with stirring for 3 hours to obtain 0.87 g of a solid copolymer. Similar copolymers were obtained also in the case where N-vinyl succinic acid amide and N-vinyl phthalimide were used, respectively, in place of the N-vinyl acetamide.

What is claimed is:

1. A copolymer consisting essentially of a 1:1 alternating copolymer of monomer (A) and monomer (B), wherein monomer (A) is a carbonyl or thiocarbonyl-containing nonconjugated unsaturated compound having the formula:

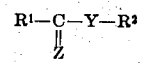

wherein $R^1$ is an $R^4$-, $R^4O$-, $R^4S$- or $R^5R^6N$- group; Z is an oxygen atom or a sulfur atom; Y is an oxygen atom, a sulfur atom or an —$NR^7$ group; $R^2$ is a hydrocarbon radical having two to 20 carbon atoms containing carbon-carbon double bond a of the vinyl, vinylidene or vinylene type; or a halogen-containing hydrocarbon radical having two to 20 carbon atoms containing a carbon-carbon double bond of the vinyl, vinylidene or vinylene type and $R^4$, $R^5$, $R^6$ and $R^7$ are individually a hydrocarbon radical having one to 20 carbon atoms selected from the group consisting of alkyl, aryl, aralkyl, alkylaryl, cycloalkyl and bridged ring cycloalkyl, a halogen containing hydrocarbon radical having one to 20 carbon atoms wherein the hydrocarbon moiety is define above or a hydrogen atom, or wherein monomer (A) is a compound selected from the group consisting of N-vinyl pyrrolidone, N-vinyl piperidone, N-vinyl caprolactam, N-vinyl succinic acid imide, N-vinyl phthalimide, N-allyl-succinic acid imide, N-isopropenyl phthalimide, N-vinyl-oxazolidinone, N-allyl-5-methyl-oxazolidinone, N-vinyl diglycolyl imide, N-vinyl-ethylene-urea, N-allyl ethyleneurea, N-vinyl ethylene thiourea, and N-ethyl-N-vinyl propylene urea, and wherein monomer (B) is a conjugated compound having the formula:

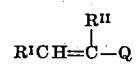

wherein R' and R'' are respectively hydrocarbon radicals having one to 20 carbon atoms, selected from the group consisting of alkyl, aryl, aralkyl, alkylaryl and cycloalkyl halogen-containing hydrocarbon radicals having one to 20 carbon atoms, wherein the hydrocarbon moiety is selected from the group consisting of alkyl, aryl, aralkyl, alkylaryl and cycloalkyl halogen atoms or a hydrogen atom, at least one of R' and R'' is a hydrogen atom, Q is a nitrile or $$-\underset{\underset{O}{\|}}{C}-Y'$$

group, wherein Y' is a group selected from ZR, ZMe, NR'R'', R, a halogen atom and a hydrogen atom; Z is an oxygen or sulfur atom; R, R' and R'' each is a hydrogen atom or a hydrocarbon-or halohydrocarbon radical having one to 20 carbon atoms, including the case where R' and R'' are mutually bonded at other portion than nitrogen; and Me represents an element of Group I of the Mendeleev Periodic Table, or an ammonium group.

2. An alternating copolymer according to claim 1, wherein said monomer of group A is an unsaturated ester of carboxylic acid, and said monomer of group B is selected from the group consisting of acrylonitrile, an acrylate, an acrylamide, acrylic acid and the above compounds in which the $\alpha$ - or $\beta$-position of the monomer of group B is substituted by a hydrocarbon group having one to 20 carbon atoms, a halogen-containing hydrocarbon group having one to 20 carbon atoms or a halogen atom.

3. An alternating copolymer according to claim 1, wherein said monomer of group A is a vinyl or allyl ester of a carboxylic acid and said monomer of group B is selected from the group consisting of acrylonitrile, an ester of acrylic acid, an acrylamide and acrylic acid.

4. An alternating copolymer according to claim 1, wherein said monomer of group A is selected from the group consisting of vinyl acetate, vinyl formate, vinyl propionate, vinyl stearate, vinyl benzoate, vinyl chloroacetate, allyl acetate, N-vinyl pyrrolidone and N-vinyl acetamide, and said monomer of group B is selected from the group consisting of acrylonitrile, alkyl acrylates, acrylamides and acrylic acid.

5. An alternating copolymer according to claim 1, wherein said monomer of group A is vinyl acetate and said monomer of group B is acrylonitrile.

6. An alternating copolymer according to claim 1, wherein said monomer of group A is vinyl acetate and said monomer of group B is methyl acrylate, ethyl acrylate, butyl acrylate or acrylic acid.

7. A process for producing a copolymer, which comprises contacting at a temperature of from $-150°$ C to $+100°$ C a monomer of group A and a monomer of group B described in claim 15 with (1) an organoaluminum halide having the formula:

$$AlR'''_nX_{3-n}$$

wherein R''' is a hydrocarbon radical having one to 20 carbon atoms; X is a halogen atom; and $n$ is an arbitrary value from 1 to 2, or a mixture of at least two compounds having the formulas:

A. $AlR'''_nX_{3-n}$, B. $Br^{IV}_3$ and C. $BX'_3$ wherein R''' and $R^{IV}$ each is a hydrocarbon radical having one to 20 carbon atoms; X and X' each is a halogen atom; and n is an arbitrary value of 1 to 2, or with (2) an organometal halide complex obtained by contacting, in the presence of at least one monomer of the group B, (a) an organic compound having the formula:

$$M'''R^V X''_p-\Xi_n$$

where M''' is a metal of Group IIb, IIIb or IVb of Mendeleev's Periodic Table; $R^V$ is a hydrocarbon group having one to 20 carbon atoms; X'' is a halogen atom; $p$ is the valency of the metal; and n is an arbitrary value of 1 to $p$, and (b) a halogeno-compound having the formula:

$$M^{IV}X'''_m R^{VI}_{q-n}$$

where $M^{IV}$ is a metal of Group IIIb or IVb of Mendeleev's Periodic Table; X''' is a halogen atom; $R^{VI}$ is a hydrocarbon radical having one to 20 carbon atoms; $q$ is the valency of the metal; and $m$ is an arbitrary value of 1 to $q$, and at least one metal component of (a) and (b) is aluminum or boron and wherein the catalyst is employed in an amount of from about 0.05 to about 10 moles per mole of monomer (B).

8. A process according to claim 7, wherein the organo-aluminum halide is an alkylaluminum dihalide, an alkylaluminum sesquihalide or a dialkylaluminum halide.

9. A process according to claim 7, wherein the copolymerization is effected in the presence of 0.01 to 5 percent of oxygen or an organic peroxide per mole of the monomer of group B.

10. A process according to claim 7, wherein the copolymerization is carried out in a liquid monomer, a hydrocarbon medium or a halogenated hydrocarbon medium.

* * * * *

UNITED STATES PATENT OFFICE
CERTIFICATE OF CORRECTION

Patent No. 3,671,492            Dated June 20, 1971

Inventor(s) Nakaguchi et al.

It is certified that error appears in the above-identified patent and that said Letters Patent are hereby corrected as shown below:

In Section [63]: change the filing date of the parent Application S.N. 567,392 from "June 25, 1966" to --July 25, 1966--.

Signed and sealed this 6th day of February 1973.

(SEAL)
Attest:

EDWARD M. FLETCHER, JR.　　　　　　　　　　ROBERT GOTTSCHALK
Attesting Officer　　　　　　　　　　　　　Commissioner of Patents